United States Patent [19]
Casson

[11] 3,915,179
[45] Oct. 28, 1975

[54] APPARATUS FOR CLEANING WHITEWALL TIRES

[75] Inventor: Orville James Casson, Rudolph, Wis.

[73] Assignee: Kathryn Gaworski, Warrenville, Ill.

[22] Filed: Mar. 14, 1974

[21] Appl. No.: 451,232

[52] U.S. Cl. ............... 134/45; 134/52; 239/DIG. 1
[51] Int. Cl.² ........................................ B08B 3/02
[58] Field of Search ............. 134/45, 52, 123, 199; 15/DIG. 2; 239/DIG. 1, 590

[56] References Cited
UNITED STATES PATENTS

| | | | |
|---|---|---|---|
| 1,183,391 | 5/1916 | Mason | 134/123 |
| 1,619,973 | 3/1927 | Haberman | 134/52 |
| 3,419,022 | 12/1968 | Youngren, Sr. et al. | 134/45 |
| 3,604,433 | 9/1971 | Notthoff | 134/45 |
| 3,667,486 | 6/1972 | Cole et al. | 134/45 |
| 3,670,743 | 6/1972 | Moore | 134/45 |

FOREIGN PATENTS OR APPLICATIONS

| 27,368 | 1/1956 | Germany | 134/45 |
|---|---|---|---|

Primary Examiner—Robert L. Bleutge
Attorney, Agent, or Firm—Wolfe, Hubbard, Leydig, Voit & Osann, Ltd.

[57] ABSTRACT

A tire cleaning apparatus in automatic car wash systems for cleaning the whitewall tires of passing vehicles with minimum power and solvent consumption. The apparatus includes a spray device with a nozzle adapted to direct a solvent in an arcuate shaped pattern that is of substantially the same curvature of the whitewall strip when impinging the tire. Arms which are actuated by the tires of passing vehicles are provided for limiting the solvent discharge to a relatively short interval when the tire is substantially adjacent the spray device. An alternative form is disclosed wherein two spray devices are provided in spaced relation in the downstream direction, each for imparting a semi-circular arcuate spray form that engages only the lower half of the tire sidewall at each location.

4 Claims, 7 Drawing Figures

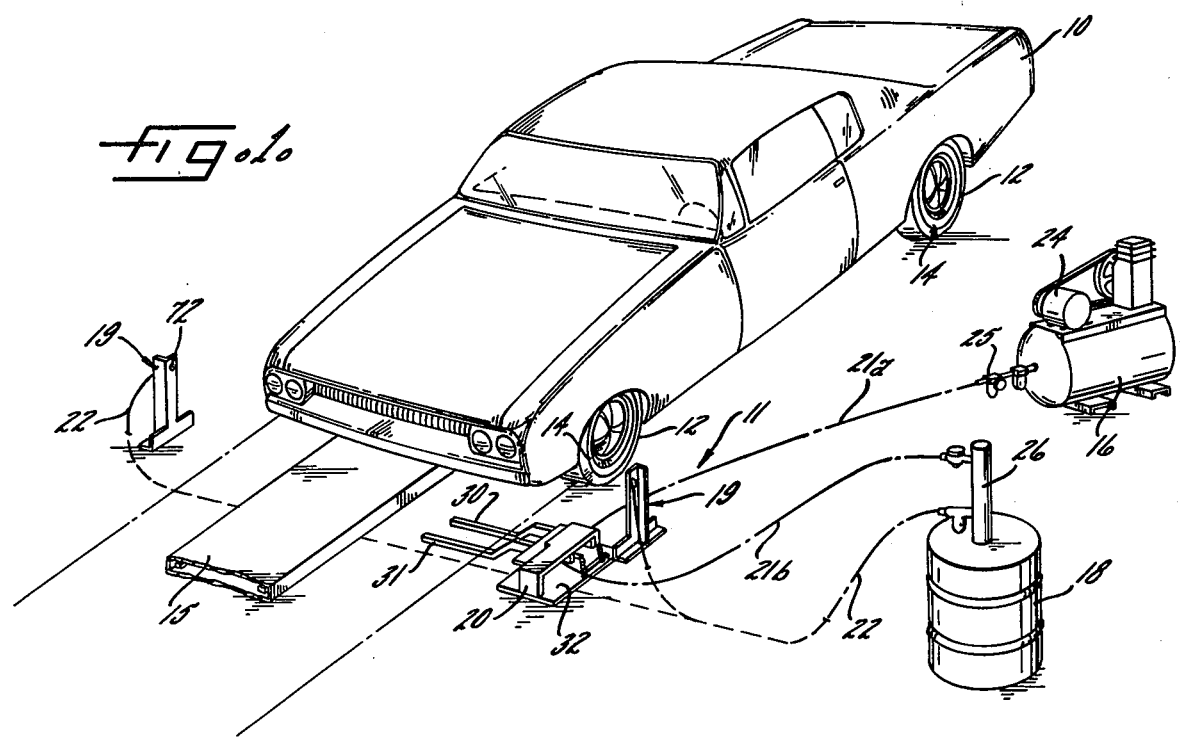

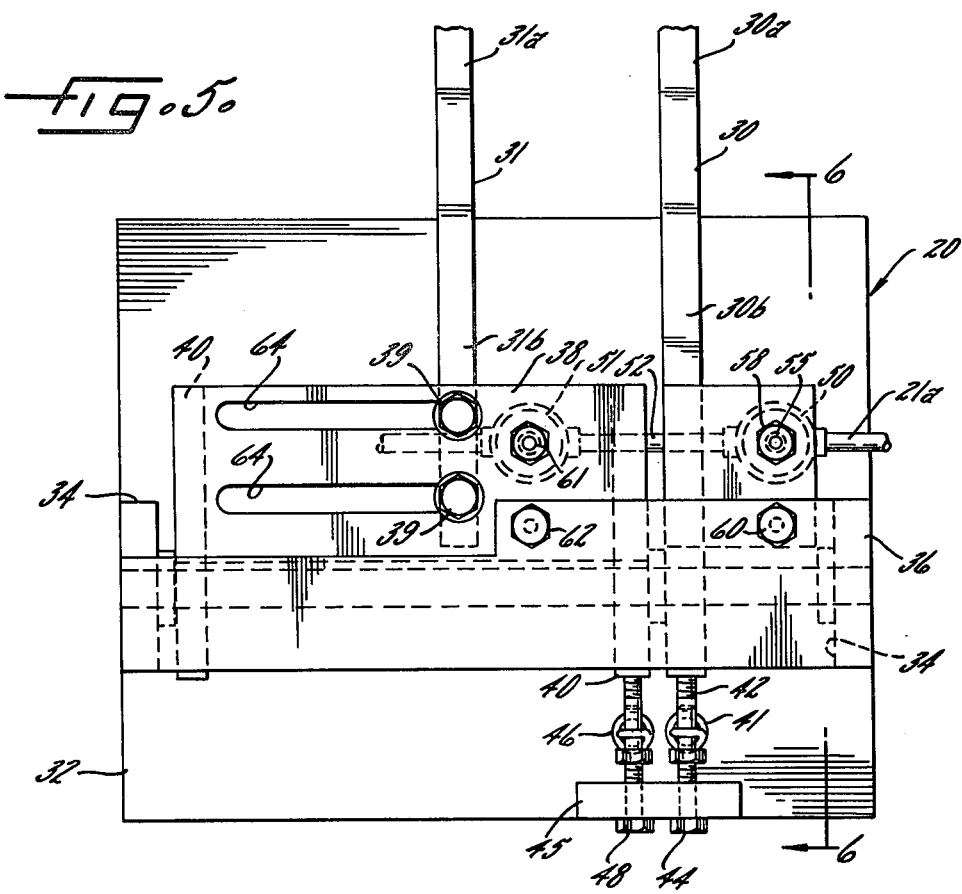
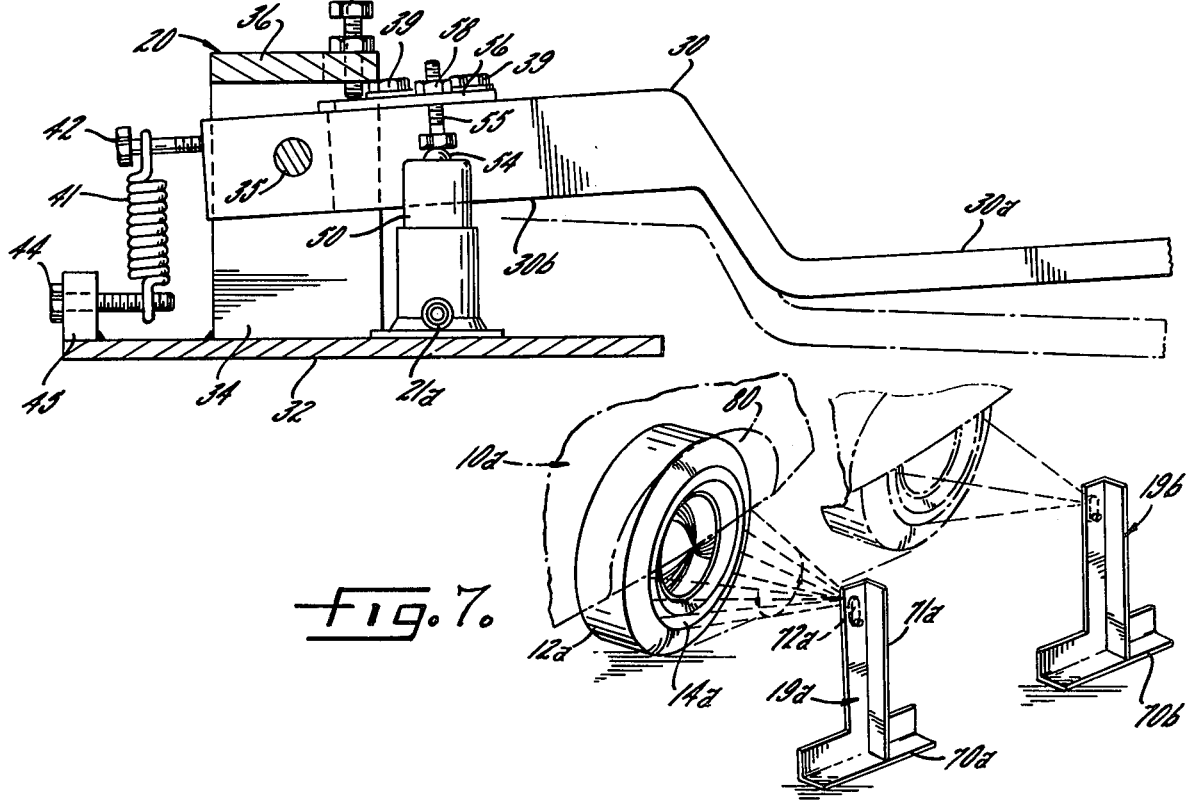

APPARATUS FOR CLEANING WHITEWALL TIRES

DESCRIPTION OF THE INVENTION

The present invention relates generally to automatic carwashing systems, and more particularly, to equipment for quickly and efficiently cleaning whitewall tires of vehicles passing through such carwash systems.

While in recent years automatic carwash establishments have gained significant popularity, the tire cleaning equipment of present carwashes still have certain drawbacks. Since the wheels are relatively inaccessible, particularly in cars having fender skirts, and are likely to become more badly soiled than other exterior portions of the vehicle, it has heretofore been difficult to effectively clean the whitewall car tires. In some present systems, relatively complex and massive tire cleaning equipment is employed which physically engage and scrub the tires. Such equipment is of considerable expense and greatly adds to the cost of the carwash system. Other forms of tire cleaning equipment in present caarwashes utilize nozzles which direct a spray of chemical and hot water solution against the tire. Such spray type systems, however, often have been uneconomical to operate due to the relatively large quantities of chemical solvent that is required to obtain satisfactory tire cleaning. Moreover, in such spray type tire cleaning apparatus the nozzles often are actuated by cords that eventually become loose so as to prevent precise regulation of the spray flow, and thus, must be set to discharge still greater amounts of solvent to insure tire cleaning.

It is an object of the present invention to provide an apparatus for more economically and efficiently cleaning whitewall car tires in automatic carwash systems.

Another object is to provide a spray type tire cleaning apparatus for automatic carwashes that is adapted to thoroughly and rapidly clean the whitewall tires of vehicles with miniumum power and solvent consumption.

A further object is to provide a tire cleaning apparatus as characterized above which is of simple and economical design and susceptible of relatively precise automatic operation.

Still another object is to provide a tire cleaning apparatus of the above kind that is adapted to effectively clean the entire side surface of the wheel even when a portion thereof is covered by a fender skirt of the vehicle.

Yet another object is to provide such a tire cleaning apparatus that requires a minimum amount of floor space and which may be readily installed in automatic carwash systems without interfering with other washing processes on the vehicle.

Other objects and advantages of the invention will become apparent upon reading the following detailed description and upon reference to the drawings, in which:

FIG. 1 is a partially diagrammatic perspective of an automobile passing through an automatic carwash system embodying the tire cleaning apparatus of the present invention;

FIG. 2 is an enlarged side elevation of a solvent spray device and its actuating mechanism with the tire of a car reaching a position for actuating the solvent discharge;

FIG. 3 is a perspective of the solvent being directed onto the tire from the illustrated spray device;

FIG. 4 is an enlarged side elevational view of the nozzle of the spray device taken in the plane of line 4—4 in FIG. 2;

FIG. 5 is an enlarged top view of the spray apparatus actuating mechanism taken in the plane of line 5—5 in FIG. 2;

FIG. 6 is an enlarged vertical section of the actuating mechanism taken in the plane of line 6—6 in FIG. 5; and FIG. 7 is a partially diagrammatic perspective of a modified form of tire cleaning apparatus adapted for cleaning tires of cars with fender skirts.

While the invention is susceptible to various modifications and alternative constructions, an illustrated embodiment has been shown in the drawings and will be described in detail. It should be understood, however, that there is not intention to limit the invention to the specific form disclosed, but on the contrary, the intention is to cover all modifications, alternative constructions, and equivalents falling within the spirit and scope of the invention.

Referring now more particularly to FIG. 1 of the drawings, there is shown a vehicle 10 passing through an automatic carwash system embodying tire cleaning apparatus 11 of the present invention. The vehicle 10 in this case is a passenger car with tires 12 each having a relatively narrow annular whitewall strip 14 of a common type. The carwash system includes a suitable conveyor means which moves the vehicle 10 to be washed along a track 15 in a predetermined path. As the vehicle 10 proceeds along the track 15 it passes various washing, rinsing, and drying stations (not shown) which act to clean the exposed exterior surfaces of the vehicle body in a conventional manner.

The tire cleaning apparatus 11 includes an air compressor 16, a solvent reservoir tank 18, solvent spray devices 19, and actuating means 20 for the spray device. Air pressure lines 21a, 21b in the illustrated embodiment connect the air compressor 16 to the reservoir 18 via the actuating mechanism 20, and a fluid supply line 22 is coupled between the reservoir 18 and the spraying devices 19. The air compressor 16, which can be located at a remote station, may be of any conventional type capable of developing and maintaining an output air pressure within predetermined limits. The air compressor 16 in this case is powered by an electric motor 24 and preferably has a capacity to develop and maintain an output pressure of about 175 p.s.i. Such air compressors, as is well known in the art, may employ pressure switch means for automatically energizing the compressor when its output pressure falls below a lower limit and automatically deenergizing the compressor when the pressure again is raised to the upper limit.

To cause a substantially constant pressure to exist in the downstream line 21a from the air compressor 16, an air pressure regulator valve 25 is provided at the output end of the compressor. The pressure regulator valve 25 restricts the output airflow from the pump in a known manner and thereby causes a lower predetermined constant pressure, preferably between 60 and 80 p.s.i., to be maintained in the line 21a.

When such pressurized air flows into the line 21b, it serves to activate a pneumatic pump 26 mounted directly above the reservoir tank 18, which in turn pumps solution from the reservoir into the line 22 to spray devices 19. The pump 26, which may be of a commonly known pulsating piston type, has an inlet to which the line 21b connects and an outlet connected to the line 22. The air pressure from the line 21b drives the pump's piston to force fluid from the tank into the line 22.

In accordance with one aspect of the invention, the actuating mechanism includes a pair of spaced arm members that are adapted to precisely regulate and limit the flow of air pressure to the reservoir pump, and thus the flow of solvent from the spray devices, to a relatively short period that a car wheel is substantially adjacent the spray devices. The illustrated actuating mechanism 20 is located to one side of the path of travel of the vehicle 10 and includes a pair of inwardly extending arms 30, 31 over which the wheels 12 on that side of the car will pass during travel of the vehicle through the washing system. The actuating mechanism 20 includes a base 32 with upstanding side panels 34 between which extends a support rod 35. A top panel 36 also is connected between the side panels 34. The arms 30, 31 are mounted in longitudinally spaced relation for independent pivotable movement with respect to the support rod 35. The arm 30 preferably is formed of a sturdy metal material and has an outwardly extending end 30a over which the car tires pass and a substantially vertical portion 30b at the opposite end through which the support rod 36 extends. The second arm 31 has a similar outwardly extending end 31a and a vertical portion 31b, the latter in this case being secured to the underside of a bracket 38 by a pair of screws 39 that pass through the bracket and threadably engage the arm portion 31b. The bracket 38 has depending flanges 40 through which the rod 36 extends for supporting the bracket 38 and the arm 31 secured thereto for pivotable movement.

The outer ends 30a, 31a of each arm are independently movable between a raised position shown in solid lines in FIG. 6 and a lowered position shown in dash lines. The arms 30, 31 in this case each are biased toward their raised position. To bias the arm 30, a tension spring 41 is coupled between a lug 42 extending outwardly from the end of the arm 30 and a bolt 44 disposed within a vertical flange 45 of the base 32. A tension spring 46 coupled between a lug 48 extending from the bracket 38 and a bolt 49 disposed within the base flange 45 serves to bias the second arm 31 in a similar manner.

To regulate the flow of air pressure from the compressor line 21a to the reservoir line 21b, a pair of pneumatic valves 50, 51 are disposed in series between the lines 21a, 21b and are actuated by a respective one of the arms 30, 31. The valve 50 in this instance is a normally closed valve and is activated or opened only when the arm end 30a is lowered, such as occurs when a vehicle tire passes over it while proceeding through the washing system. A line 52 connects the valve 50 to the second valve 51 which is normally maintained in an open position.

The first valve 50 is mounted in upstanding relation on the base 32 and is connected at its lower end to the air compressor line 21a. The valve 50 includes a vertically movable actuating ball 54 that is biased in a raised valve closing position, such as shown in FIG. 6. When a car tire 12 passes over the arm 30 to lower the outer end thereof, a lug 55 carried by the arm 30 is similarly lowered to depress the ball 54 and open the valve 50. The lug 55 in this case is a bolt mounted in depending fashion from a substantially horizontal plate 56 extending from the top of the arm portion 30b over the valve. In the illustrated embodiment, the bolt 55 threadably engages a nut 58 fixed to the plate 56 so that selective rotation of the bolt results in its adjustment. The bolt 55 preferably is adjusted so as to be in contact with the actuating ball 54 when the arm is raised to its uppermost position. In order to adjustably limit the upper position of the arm 30 an adjustable bolt 60 is mounted within the top panel 36 and is engageable by the arm plate 56 when the arm is raised.

From the foregoing, it can be seen that when the first arm 30 is depressed by a passing vehicle tire 12, the lug 55 will depress the ball 54 to open the normally closed valve 50 and permit pressurized air to flow from the compressor line 21a through the connecting line 52, the normally open valve 51, and into the reservoir line 21b to cause solvent to be pumped from the reservoir.

In order to limit the air flow into the reservoir line 21b, and the quantity of solvent that is sprayed onto the tire, the second arm 31 is adapted to close its associated normally open valve 51 to terminate the flow of solvent from the storage tank even though the tire may still be depressing the first arm 30. The second valve 51 also is mounted in upstanding position on the base 32 and includes a suitable actuating ball or member at its upper end. The valve 51 in this case is designed in a known manner so that when the actuating ball is in a normally raised position the valve is open, and when in a lowered position is closed. To actuate the valve, an adjustable bolt 61 is mounted in depending fashion from the arm bracket 38 for engagement with the valve ball. An adjustable depending bolt 62 also is provided to limit upward movement of the arm 31. Thus, if the arm 31 is depressed, the valve 51 will close to terminate the flow of air pressure to the reservoir line 21b even though the tire may still be in contact with the first arm 30.

In keeping with the invention, the second arm 31 is adjustably positionable in a longitudinal direction with respect to the first arm 30 so as to permit precise regulation of the quantity of solvent to be applied to each wheel. In the illustrated embodiment, as shown in FIG. 5, the two screws 39 that secure the second arm 31 to the bracket 38 each are retained in respective longitudinal slot 64 formed in the bracket. By merely loosening the screws 39, the arm 31 may be positioned along the slots 64 so as to achieve a spacing from the first arm 31 that results in the desired interval that air pressure is permitted to flow into the reservoir line 21b. It will be seen that the greater the spacing between the arms 30, 31 the longer period of time pressure will flow into the line 21b and the greater quantity of solvent that will be sprayed for each passing wheel. Since a few seconds of spraying generally is sufficient to saturate the tire, the arms preferably are spaced so that the solvent discharge is limited to such a short interval when the wheel is substantially adjacent the spraying devices 19.

In accordance with another aspect of the invention, the spray devices each have nozzles that are adapted to discharge the solvent in an arcuate form of substantially the same curvature as the tire sidewall it impinges. The illustrated spray devices each include a base member 70 with an upstanding channel 71 that supports a nozzle 72 at about the same elevation as the center of the passing wheel 12. As best shown in FIG. 4, the line 22 is connected to a coupling member 74 supported within the upstanding channel 71. An elbow 75 and conduit 76 in turn connect the coupling 74 to the nozzle 72. The illustrated nozzle 72 is formed with a conical aperture 78 within which is supported in spaced relation a conically shaped member 79 that defines outwardly diverging fluid passages. It will be seen that fluid emitted under pressure from such nozzle will be directed in an outwardly diverging hollow conical form that has an annular cross-section at any point. The spraying devices 19 are positioned at such selected distances from the passing tire 14 that the diameter of the annular spray form is substantially the same as the diameter of the tire sidewall when it impinges the tire.

Since the spray is of a hollow conical shape substantially lesser quantities are applied to each tire than in prior spray type tire cleaning devices. Nevertheless, since the solvent is directed nearly entirely onto the sidewall portion of the tire 12, the whitewall strip 14 is quickly saturated so as to enable effective cleaning. The solvent that runs down the tire after striking the sidewall has been found ample to facilitate cleaning the remainder of the wheel. To further enhance cleaning of the wheels, conventional brushes may be positioned downstream of the spray devices such that they are engaged by the passing wheels after the cleaning solvent has been applied.

In addition to the conservation of solvent achieved by the arcuate spray form, maximum utilization of the solvent is further affected by precisely limiting the spray discharge from the nozzles 72 to the relatively short interval that a tire 12 is directly adjacent the nozzle. In the illustrated embodiment, each spray device 19 is located just slightly upstream of the actuating mechanisms 20 so that when the tire engages the first arm 30 to cause a discharge of solvent from the nozzles 72 the wheel center is only slightly upstream of the nozzle as shown in FIG. 2, and when the tire engages the second arm 31 to terminate the fluid flow the center of the wheel has proceeded to a point just slightly downstream of the nozzle. Since the second arm 31 may be set at an adjustable spacing from the first so as to terminate the solvent flow before the first arm has been released by the tire it can be seen that the interval of spraying can be easily limited to a relatively short period of a few seconds.

Solvent conservation may further be achieved by the double armed actuating mechanism 20 in the event the carwash system stalls or is shut down with a vehicle tire positioned adjacent the spray devices 19. In such case, if both arms 30, 31 are depressed by the tire 12, although the first valve 50 will be held open the second valve 51 will close to prevent the discharge of solvent, which might otherwise result in substantial waste.

Referring now to FIG. 7, there is shown an alternative form of the invention that is particularly adapted for cleaning whitewall tires of vehicles 10a having fender skirts 80. In this embodiment, parts similar to those previously described have been given the same reference numeral with the distinguishing suffix a, or b added. The fender skirt 80 of the illustrated vehicle 10a covers approximately the upper one half of the wheel in a conventional manner. For cleaning the tire 12a in this case, a pair of spray devices 19a, 19b are positioned in spaced relation along the path of travel of vehicle for successively cleaning one half of each passing tire. The spray devices 19a, 19b are similar to those described above except that their nozzles each impart an arcuate spray form that is semi-circular in cross-section so as to impinge only the lower exposed half of the tire 12. In the usual case, the spacing between the spray devices 19a, 19b would be approximately one half of the outer circumference of the tire 12a so that the unexposed half of the tire at the first spray device 19a will be exposed when adjacent the second spray device 19b. It will be understood that each spray device may have an actuating mechanism similar to that described above for limiting its respective solvent discharge to a short interval when the tire is substantially adjacent the nozzle. While the use of such dual spray devices is particularly adapted for cleaning tires of vehicles with fender skirts it will similarly clean tires of vehicles without skirts.

In view of the foregoing, it can be seen that the tire cleaning apparatus of the present invention is adapted to effectively clean the whitewall tires of vehicles with minimum power and solvent consumption. While the equipment is of relatively simple design, it is susceptible to precise automatic operation. Moreover, since the spray devices and their actuating mechanism require a minimum amount of floor space and the air compressor and reservoir tank may be located at remote locations, the apparatus may be readily installed in an automatic carwash system without interfering with other of the washing processes. Furthermore, while in the illustrated embodiment, an independent air compressor has been shown, it will be understood that the reservoir pump may be connected into any suitable central air pressure supply system.

I claim as my invention:

1. An apparatus for cleaning the sidewalls of tires of passing vehicles in an automatic carwash system comprising a fluid reservoir, fluid spray means, means connecting said reservoir to said spray means, power means for forcing fluid from said reservoir through said connecting means and out said spray means for impinging the sidewalls of passing vehicle tires, a nozzle for imparting an arcuate form to the output flow of solvent from said spray means that is of substantially the same curvature as the tire sidewall when impinging said sidewall, means for automatically limiting the flow of fluid from said spray means to a predetermined relatively short interval when said passing tire is substantially adjacent said nozzle, said flow limiting means including a first normally closed valve which prevents the flow of fluid from said spray means when in a normally closed position and a second normally open valve downstream of said first valve, means connecting said first and second valves, a base at one side of travel of said vehicle, one arm pivotably mounted on said base and having one end positioned such that the tire of a passing vehicle causes downward pivotable movement thereof to open said first valve and permit fluid flow to be passed through said second valve and be discharged from said nozzle, and a second arm pivotably mounted on said base at a point downstream from said first arm and having an end thereof positioned such that the tire of said passing vehicle causes downward pivotable movement thereof to close said second valve and terminate the flow of fluid from said nozzle.

2. The apparatus of claim 1 in which said arms are spaced apart such that said second arm is depresssed by a passing vehicle tire prior to release of said first arm by said tire.

3. The apparatus of claim 2 in which the other end of each of said arms is independently resiliently biased in a manner that urges their outer ends toward raised positions.

4. The apparatus of claim 1 in which said second arm is selectively adjustable in a downstream longitudinal direction relative to said first arm to selectively vary the length of discharge of fluid from said nozzle.

* * * * *